United States Patent [19]
Adachi

[11] 4,139,988
[45] Feb. 20, 1979

[54] VEHICLE HYDRAULIC POWER OPERATING SYSTEM

[75] Inventor: Yoshiharu Adachi, Gamagori, Japan

[73] Assignee: Aisin Seiki Kabushiki Kaisha, Kariya, Japan

[21] Appl. No.: 753,476

[22] Filed: Dec. 22, 1976

[30] Foreign Application Priority Data

Dec. 27, 1975 [JP] Japan .................................. 50-157931
Dec. 29, 1975 [JP] Japan .................................. 50-157770

[51] Int. Cl.² ............................................ B60T 13/12
[52] U.S. Cl. ............................... 60/548; 60/547 A; 91/520; 91/532
[58] Field of Search ................... 60/547, 548, 554, 582; 91/412, 31

[56] References Cited

U.S. PATENT DOCUMENTS

| 3,131,538 | 5/1964 | Schultz | 60/548 |
| 3,568,868 | 3/1971 | Chichester | 91/412 |
| 3,662,548 | 5/1972 | Suzuki | 91/412 |
| 3,699,680 | 10/1972 | Shellhause | 60/548 |
| 3,768,608 | 10/1973 | Fulmer | 60/547 |
| 3,979,912 | 9/1976 | Kuromitsu | 60/547 |

Primary Examiner—Martin P. Schwadron
Assistant Examiner—Abraham Hershkovitz
Attorney, Agent, or Firm—Burns, Doane, Swecker & Mathis

[57] ABSTRACT

A hydraulic system for a vehicle having an open center type braking booster and the other hydraulic operating system e.g. power steering having open center type valve mechanism, both being in fluid communication with a discharging port of an engine driven pump for receiving input fluid flow through a flow divider.

The invention provides, at an early stage of the braking operation, means for fluid communication between the discharge port of the power steering system and the inlet port of the booster other than communication between the discharging port of the flow divider and the inlet port of the booster.

1 Claim, 10 Drawing Figures

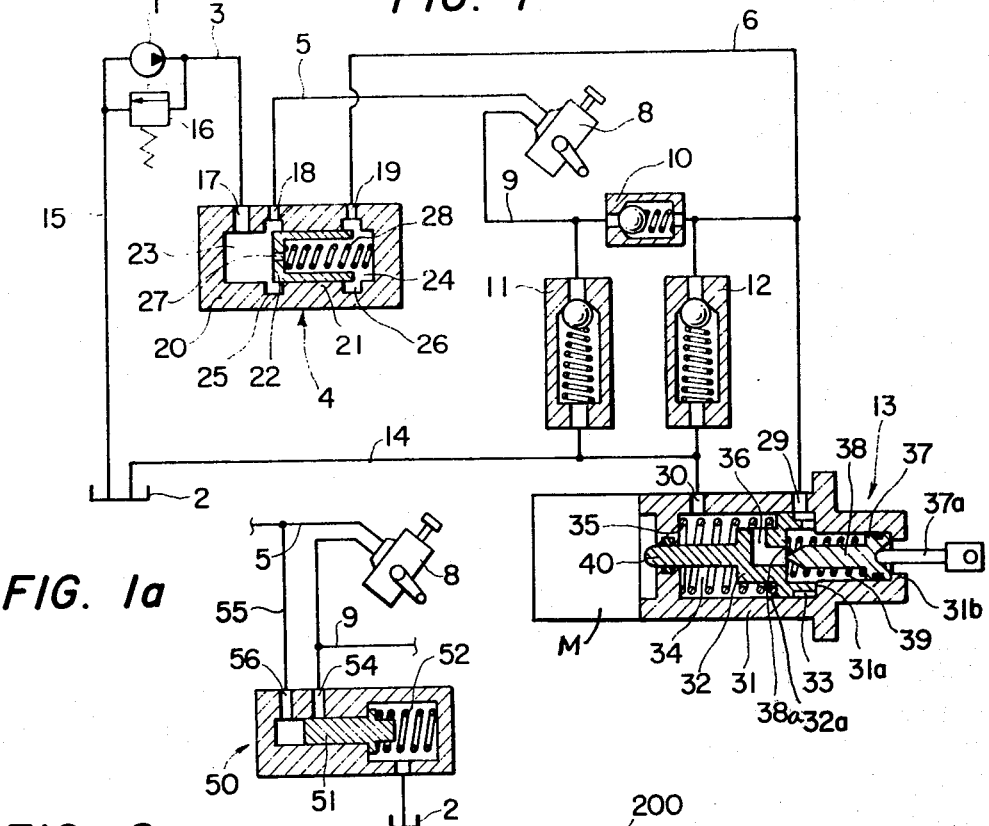
FIG. 1
FIG. 1a
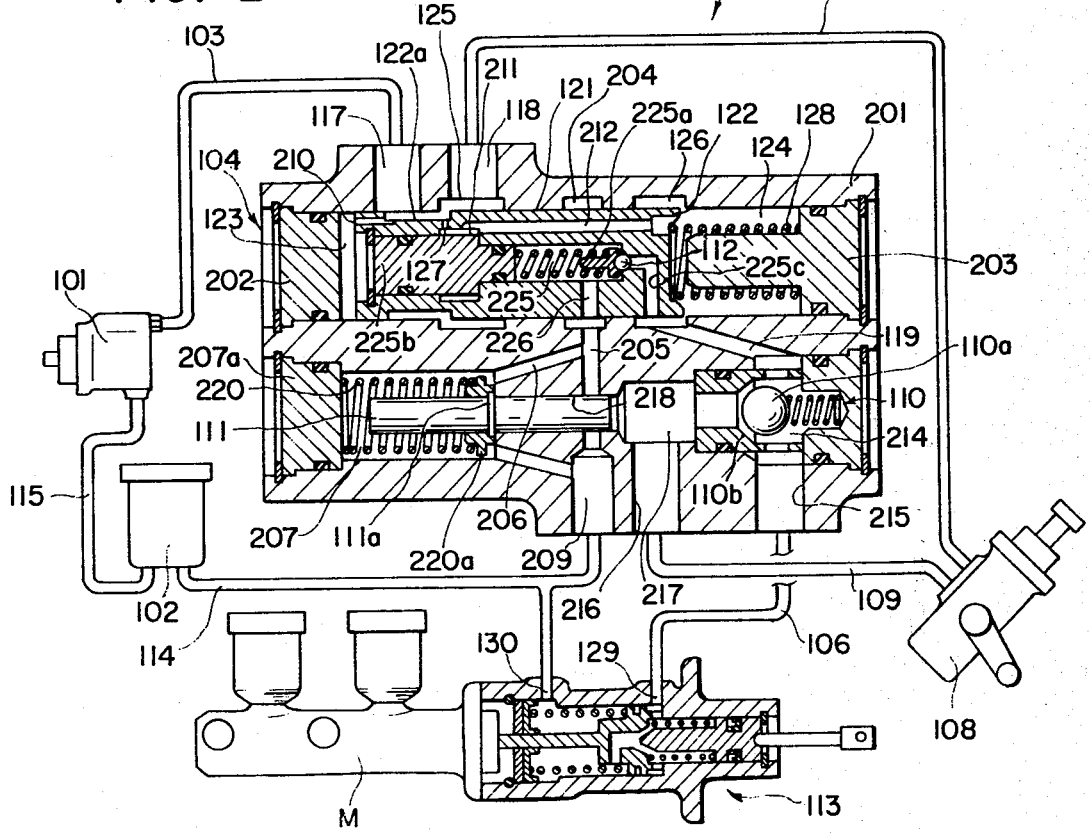
FIG. 2

VEHICLE HYDRAULIC POWER OPERATING SYSTEM

BACKGROUND OF THE INVENTION

This invention relates to a hydraulic power operating system for the brakes of a vehicle, the system being adapted to obtain hydraulic fluid under pressure from, at first, the hydraulic power steering system of the vehicle other than that which is available directly from a source of hydraulic fluid and thereafter only from the source through a flow divider.

It has heretofore been known in the art that there exist two types of hydraulic power braking system. One of the types is that in which the hydraulic power system is so arranged in a hydraulic fluid circuit as to form in series the source of hydraulic fluid, the hydraulic power steering system and the power braking system so that the power braking system obtains hydraulic fluid from the precedingly located steering system. The other system has an unloading valve regulator or flow divider which controls the flow from the source so as to supply a portion thereof to the power steering system and remainder of the flow to the braking system regardless of whether any one or both of the two systems are actuated or not.

The first type is beneficially enabled to completely utilize whole quantity of fluid discharged from the source but is considered to be disadvantageous in that, a pressure drop is caused by actuating the preceding steering system and accordingly the power braking system is obliged disadvantageously to receive the resultant lower level pressure fluid from the steering system. In order to compensate for such pressure drop, the supply source is also obliged to be preset a larger supplying ability, i.e., capacity and accordingly a larger volume of space for equipment.

The second type is considered to be advantageous in utilizing the higher range of fluid pressure discharged from the supply source, but is considered disadvantageous in that, merely a portion of the flow from the source is utilized for actuating the power braking system so that a larger supplying ability is also required.

It may be fairly safely mentioned that, for prompt operation purpose, a comparatively larger quantity of fluid flow is desirable in actuating the power braking system at the early stage of the operation than is required at the subsequant stage of the operation. The reason is that a considerable quantity of fluid is required in order to compensate for a quantity of fluid consumed for an idling stroke (e.g. the displacement of the brake show across the gap between the rest position of the shoe and the drum) of a power piston in the wheel cylinder of the brakes and to compensate for any strain usually exhibited by all the associating parts of the braking system, such as for example, resiliently restorable expansion of conduits forming the system due to the fluid pressure.

In order to safely brake a traveling vehicle, it is desireable to decrease the above mentioned idling period of time by supplying a larger quantity of fluid at the first stage of braking operation.

On the other hand, in order to effect sufficient and prompt braking force in the second stage, the pressure drop by actuating the steering device is undesirable.

The first type of present day hydraulic braking systems is able to suit the former condition but is unable to meet the latter requirement and with the second type the reversal takes place.

A solution is now demanded to provide means to meet both of such inconsistent requirements for a hydraulic power operating system having a series of a hydraulic fluid supplying source, a power steering system and a power braking system.

SUMMARY OF THE INVENTION

A principal object of the invention is to provide an improved hydraulic power operating system for the brakes of a vehicle which is able to decrease the first period of time in which flow of fluid is consumed in order to compensate for that utilized for idling and strain of parts of the braking system.

The foregoing and other objects are attained according to at least one aspect of the present invention by providing a means for obtaining hydraulic fluid flow for the power braking system from the power steering system at an early stage of the braking operation other than that which is available from the source of supply and thereafter, at a second stage, obtaining hydraulic fluid directly from the supplying source through a flow divider like the steering system does.

Thus, in the embodiments, there are comprised a source of pressurized hydraulic fluid, a flow divider regulator being in fluid communication with the source of hydraulic fluid for receiving fluid from the source and having a pair of fluid outlets for discharging the hydraulic fluid, a hydraulic fluid vehicle brake system including a master cylinder and hydraulic booster and other hydraulic fluidically operating means including open type valve mechanism for exerting a fluid pressure by restricting fluid flow. The booster includes also open type valve mechanism having an inlet port being in fluid communication with one of the outlets of the flow divider for receiving fluid from the flow divider and further having an outlet in fluid communication with a reservoir for delivering fluid into the reservoir. The booster is operatively connected to the master cylinder for assisting and pressurizing fluid in the master cylinder by utilizing fluid pressure built up by restricting fluid flow therethrough.

BRIEF DESCRIPTION OF THE DRAWING

FIG. 1 shows somewhat schematic cross section of parts forming the invention and connected into a diagramatically represented embodiment of a hydraulic system for vehicles according to the invention;

FIG. 1a shows one modification of the connection with one part somewhat schematic;

FIG. 2 shows a more practical embodiment which may be ready to be applied to any type of vehicle;

DESCRIPTION OF THE PREFERRED EMBODIMENTS

Figure 3:
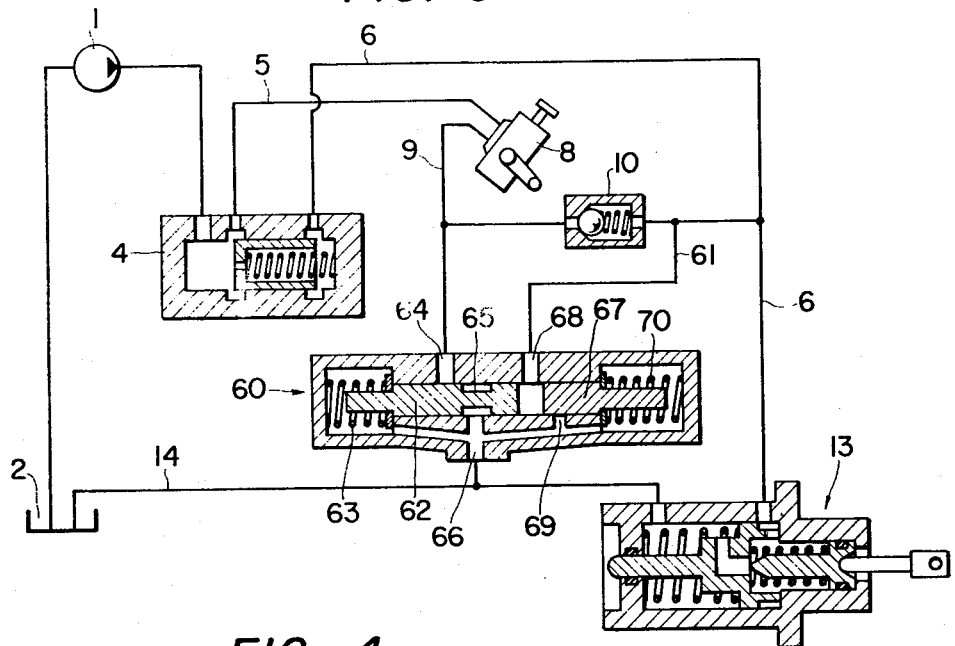
FIG. 3 shows still another embodiment with the modified part shown somewhat in schematic longitudinal cross section together with some associating parts; and FIGS. from 4 to 6 show the other different embodiments of the present invention.

Referring now to FIG. 1, the power system according to the invention consists of a hydraulic pump 1 that provides a source of hydraulic fluid under pressure for delivery through a line 3 to a flow divider valve 4. The pump 1 is connected to the reservoir 2 through a suction pipe 15. The pump discharge line 3 is connected through a by-pass control relief valve 16 with the suction pipe 15 for maintaining maximum pressure of the fluid in the discharge line 3 at a predetermined value.

Hydraulic fluid under pressure is delivered from the fluid pump 1 through the line 3 to the inlet port 17 of the flow divider 4 and is adapted to be circulated through the lines 5 and 6 depending upon the position of the control valve spool 22 located within the flow divider valve 4.

As shown in FIG. 1, fluid under pressure is being delivered into the steering device 8 by which the device is power driven in steering the vehicle. The hydraulic fluid is concurrently, being exhausted from the steering device for delivery into the return line 9 leading through a check valve 10 to an inlet port 29 of the hydraulic power mechanism 13 for operating the brakes of the vehicle. Normally the hydraulic power mechanism 13 allows free flow of hydraulic fluid from the inlet 29 to the outlet 30 in a manner hereinbelow described so that the return conduit 14 can receive the hydraulic fluid that is returning from the steering control mechanism for delivery back into the reservoir 2.

When the hydraulic power mechanism 13 is operated for actuating the brakes of the vehicle, the flow of hydraulic fluid through the power mechanism 13 is retarded and pressure builds up in the power chamber 33 for operating the power piston 32 of the power unit 13 in a left-hand direction, in a manner hereinafter described. If sufficient pressure builds up in the power chamber 33, the bypass relief valve 12 can open to allow excess fluid to be delivered into conduit 14 for return to the reservoir 2, so that discharge pressure of the pump 1 may be maintained below the predetermined value which is presetable by the relief valve 16 as stated previously.

The power piston 32 of the power mechanism 13 has a leftwardly extending displacement plunger which, upon movement in a left-hand direction, as viewed in FIG. 1, causes displacement of a power piston (not shown) of the known brake master cylinder M to be carried by being attached to the left end of the mechanism 13. The detailed structure of the master cylinder does not form the invention and is so conventional that further description is considered to be abbreviated.

A brake pedal (not shown) operating through a linkage 37a actuates the control valve element 38 of the hydraulic power mechanism 13 in a manner more fully described hereinafter.

The valve element 38 has a conical valve face at its lefthand extremity as viewed in order to associate with the entrance of the path 36 in the power piston 32 for effecting a control valve. A coiled compressed spring 39 bears against, at its left end, the power piston 32 and at the other end against a shoulder 37 of the valve element 38 so that the element is normally spring-urged toward abutment against the internal right-hand end 31b of the housing 31 in the rest position of the mechanisms 13. The large coiled compressed spring 35 bears against, at its left end, the internal left end of the housing 31 and at the other end against the shoulder 32a of the piston 32 in order to urge the piston 32 normally to the shoulder 31a of the housing 31 in the rest position. The force of the spring 35 is so preset that it may exceeds that of the spring 39. The spring 35 therefore urges normally the piston 32 toward abutment against the shoulder 32a to the position in which the brake is retracted. The power piston 32 defines in the housing 31 a chamber 34 other than the power chamber 33. Both chambers 34 and 33 are fluidically communicated in opened position of the valve element 38.

What has been thus far described in the foregoing paragraph is an ordinary known structure of the mechanism and its operation will readily be understood by the following description.

The control valve member 38 is slidable within the axial bore in the housing 31 of the mechanism 13 and the power piston 32 is also slidable within another axial bore diametrically larger than that within which the valve member 38 slides for forming the shoulder 31a. The chamber 34 is connected with the power chamber 33 by the passage 36 in case with the valve member disengages from the entrance of the passage 36 as viewed in FIG. 1.

With the control valve member 38 in the position shown in FIG. 1, the power chamber 33 receives return fluid from the steering control device 8 through the conduit 9, check valve 10, and a part of the conduit 6 and otherwise receives from the flow divider 4 through the outlet port 19, and the common conduit 6. The fluid flows past the valve face 38a and through the passage 36, chamber 34, outlet 30 and return conduit 14 to the reservoir 2.

It will thus be seen that when the hydraulic power brake device 13 is in the position shown in FIG. 1, there will be a relatively free flow of hydraulic fluid through the mechanism for return of fluid from the steering control valve 8 to the reservoir 2. Normally the valve member 38 is retained in the position shown in FIG. 1 by means of the spring 39 and the shoulder 31b or a stop to limit the righthand movement of the valve member 38 to the position shown in FIG. 1.

When valve member 38 is moved in a left-hand direction on movement of the brake pedal (not shown), chamber 33 is gradually closed by the land 38a on the valve member 38 to thereby increase resistance to flow of hydraulic fluid through the chamber 33 that is returing through the passage conduit 6. This causes a pressure fluid build up in the power chamber 33 to drive the piston 32 in a left-hand direction.

As the requirement for braking of the vehicle increases, the valve member 38 is moved further forward in a left-hand direction so that there is a steady increase in pressure in power chamber 33 to meet the braking requirement to power drive the piston 32 in a left-hand direction with resultant increase of pressure to the power piston of brake master cylinder so that the required braking is effected.

Returning now to a detailed description of the flow-divider regulator valve 4, it is made up generally of a body 20 which is shown diagramatically. The pump port 17 is shown as forming the mouth of a valve bore 21 which contains, in close fitting slidable relationship, a valve plunger 22 of generally cylindrical shape having, a larger internal cylindrical recess receiving one end of a control spring 28, the other end of which is seated in the end of the bore 21.

The valve plunger 22 is also formed with a small bleed orifice 27 passing through its end wall so as to permit flow of fluid through the plunger from the pump port 17 to the right-hand or spring-containing cavity of bores 21. When plunger 22 is in its free position, urged by the spring leftward into contact with the internal end face of the bore 21, an annular recess 25, to which the power steering conduit 5 is connected by a drilled port or passage 18, is blocked. However, as will be described later in connection with operation of the system, it will be noted that if the plunger 22 is moved to the right a short distance as shown by pressurizing the chamber 23 against the calibrated spring 28, such communication can be established. The booster port 19 is positioned in the body 20 and is connected to an annular recess 26 formed in the face of the bore 21.

In operation, as will be usual, the pump 1 produces a regulated flow of fluid, which is normally not pressurized until power braking function and/or power steering function is required and the power steering device and/or the power braking device 13 is actuated, causing the valve in them to restrict pump flow and thereby increases the pressure in them. A small portion of the pump flow entering the chamber 23 past the port 17 will pass through the orifice 27 into the spring containing chamber 24. The orifice 27 should be so sized that a flow therethrough will create a pressure drop such that the pressure on the left-hand end of plunger 22 exceeds that in the spring chamber 24 sufficiently to exert a force on the area of plunger 22 which exceeds the installed load of the spring 28 and the plunger 22 will therefore move to the right opening communication between ports 17 and 18 by means of the annular recess 25 and permitting the remainder of the pump flow to continue to the steering conduit 5 and thence to the steering device 8, and finally to the reservoir. If the power steering system is actuated, causing restriction in the flow, pressure will rise in conduit 5 and also in conduit 3 and the increase in pressure will have a tendency to increase the flow through the orifice 27. This increased flow results in increased pressure drop, which will cause the plunger 22 to move further to the right until it partially covers the annular recess 26 and adds sufficient restriction to the flow to maintain the predetermined quantity. Inherently there will be a slight increase in flow because of the slight increase in pressure drop required to compensate for the added load of the spring. Thus, it will be seen that regardless of whether the power steering system is used or not a more or less closely regulated small flow will continue through orifice 27.

If the power braking booster 13 is actuated, also causing restriction in the flow, pressure will rise in conduit 6 and also in spring chamber 24. As this happens, the spring 28 will force the plunger 22 to the left and, at some preestablished pressure differential between the chambers 23 and 24, the plunger will be brought into such proximity to the closing of the annular recess 25 that a pressure rise will be created by the fluid flow past the proximity within the chamber 23. At some limit of pressure to which such pressure rise might attain, pressure differential between both faces of the plunger 22 will become identical with the former one, with the result that regardless of whether the booster is actuated or not, a more or less closely regulated small flow will continue through orifice 27 as previously described.

It will be seen that the flow divider valve 4 operates to divide the pump flow in a suitable predetermined ratio and provides for the smaller portion of flow to be delivered through the passage 19 while the major portion of pump flow continues to pass through the open center power steering device 8 in the usual manner and it should be understood that the operation of either device does not in any way affect the behavior of the other. Therefore a substantial economy results from the ability to use only one pump, since provision of a second pump for the braking system would represent a substantially greater cost than that represented by the flow divider.

What has been thus far described is a brake system of previously provided, generally, structure, as commonly used in automotive vehicles. The system of the present invention is further characterized in that, at an early start of the braking operation means to obtain hydraulic fluid from the power steering device 8 is provided for the power braking booster 13 other than that which is available without passing through the steering system and further to allow the discharging flow from the steering device 8 to flow into the return line 14 for delivery into the reservoir 2 directly, at the subsequent stage of the braking operation.

The discharging port of the steering device 8 is connected through a line 9 and a relief valve 11 to the return line 14 and otherwise is connected commonly through the same line 9 and a check valve 10 to the flow divider port 29 of the booster 13. At some predetermined high limit of pressure in the line 9, the force which it exerts on the ball of the relief valve 11 will have increased to the point where it can overcome the installed load of the spring of the valve 11 and the same is opened. The discharged fluid from the steering device 8 accordingly flows through the line 9, relief valve 11 and return line 14 to the reservoir, and at the same time the check valve 10 is closed so that the booster receives fluid only through the line 6 from the outlet port 19 of the flow divider 4.

As stated previously, at an early stage of the braking operation, the necessity to promptly supply a sufficient quantity of fluid to the booster is urgent for safe brake purpose since the idling of the brake wheel cylinders and strain of any parts of the system all occur at such stage. Reversely to this, at the subsequent second stage, the prompt increase in pressure rather becomes urgent more than the increase of flow, for the same salt braking purpose.

It will be understood from fron the foregoing that until the relief valve 11 is opened, at the first stage, the booster 13 receives while quatity of the discharged fluid from the pump 1 whereas after the valve 11 is opened a portion of the pump flow from the outlet port 19 will flow through the booster without being affected by the pressure drop by the steering device.

From the above, it will be obvious that the apparatus of the invention properly suits the aforementioned two requirements at the first and second stages respectively,.

In FIG. 2 is shown a more actually embodying apparatus. Parts similar to those shown in FIG. 1 are designated by the same numerals in 100 series while parts which have no corresponding part in FIG. 1 are designated with numerals in 200 series.

The system shown in FIG. 2 is made up generally of a body casting 201, which may be of a gray iron or other suitable material. The pump port 117 at the upper left in FIG. 2 is shown as forming the mouth of a valve bore 121 which contains in close fitting slidable relationship, a plunger 122 of generally cylindrical shape having a large internal recess 225 receiving one end of a restoring spring 225a the other end of which bears against a plug 225b closing that recess, so that a check valve 112 is normally seated as shown to close a path 225c. A control spring 128 bears against the right hand face of the plunger 122 and another plug 203 at its both ends respectively. The discharge port of the pump 101 is conducted by a conduit 103 to the pump inlet port 117. A power steering port 118 is connected by a conduit 105 to the inlet port of the open-center valve portion of the power steering device 108, which is of conventional construction. The outlet port of the steering device 108 is connected through a conduit 109 with a inlet 216 which communicates with a chamber 217. The chamber 217 is connected through a check valve 110 formed of a seat 110b, ball 110a and its restoring spring within chamber 214. Within chamber 217, a plunger 111 exposes its acting face to form a relief valve corresponding to that shown in FIG. 1 at 11. The plunger 111 is in close fitting slidable relationship with a bore 218 across a drilled passage 205 connecting an inlet 226 leading to the chamber 225 with an outlet 209 to which is connected a return line 114 for delivery of fluid into reservoir 102. The plunger 111 is normally urged to the right by a spring 220 which is seated at its left end in a plug 207a and at the other end in a retainer 220a engaging a shoulder 111a of the plunger 111. The plug 207a defines a chamber 207 which connects through passage 206 with the drilled passage 205 and outlet port 209 th thereby be normally conductive with the reservoir through the line 114.

The booster 113 has an inlet port 129 which is connected through a conduit 106 with an inlet 215 which in turn connects with the chamber 214. An outlet port 130 of the booster 113 is connected through the return line 114 with the reservoir 102.

In operation, at the early stage of the braking operation, discharging fluid from the steering device 108 passes through conduit 109, inlet port 216, and chamber 217 and past the disengaging ball 110a and seat 110b into the chamber 214 which in turn conducts the fluid to the inlet 129 of the booster 113 through conduit 106. The chamber 214 is supplied through the outlet port 119 regulated fluid flow past the recess 126 in the internal face of the bore 121 and right edge of the plunger 122. In case where pressure in the line 106 rises due to restriction in the flow within the booster 113 by actuation thereof, the ball 110a contacts with its seat 110b to thereby blockade communication between the chambers 217 and 214. Series relationship in connection between the steering device 108 and the booster 113 is thereby changed to the parallel relationship to the pump 101. The booster 113 thereafter is supplied regulated fluid flow from the outlet port 119 and the steering device 108 discharging fluid flow through line 109, inlet port 216, and chamber 217 to the chamber 217 and in turn past the plunger 111 which is retractable to the left to communicate chamber 217 with the outlet port 209 upon rise of fluid pressure within the chamber 217 due to closure of the ball valve 110a. Further description is considered to be abbreviated because of readiness of understanding the other operation from the description in the foregoing with respect to the first embodiment shown in FIG. 1.

In FIG. 1a is shown a relief valve 50 on a short-circuit 55 to connect line 5 and line 9. In case of larger actuation of the steering device such as for example when the steering wheel is circulated in greater degree of angle for the purpose entering the vehicle into its garage, pressure within the line 5 and line 3 correspondingly might attain to an unusual high level as would open the relief valve 16. The steering device 8 will thereafter unable to rise fluid pressure therewithin. The relief valve 50 provides means to prevent the pressure from rising up to such value. A plunger 51 is normally urged to the left by a control spring 52 so that the port 54 is closed. An elastic force of the control spring 52 is so preset as to become eclipsed when it is subjected to a pressure of predetermined force through the plunger 51 so that communication between the ports 54 and 56 is allowed.

In FIG. 3 is shown a modification of the relief valves 11 and 12 shown in FIG. 1. The other associating parts are strictly in accord with those shown in FIg. 1. The same numerals are used therefore in designating such associating parts in FIG. 3 as FIG. 1. This is believed to facilitate understanding that modification by anybody. At the central portion of FIG. 3, the modified part is generally shown at 60. The right hand half of the relief valve assembly 60 corresponds to the relief valve 12 while the left hand half of the assembly 60 corresponds to the valve 11 in FIG. 1.

When the pressure within the line 6 rises to a predetermined level by actuation of booster 13, causing restriction in the flow, the increase in pressure causes the check valve 10 to close and the increase is otherwise transmitted into the valve assembly 60 through line 61. The plunger 62 is leftward shifted by being subjected to that pressure against a control spring 63 to thereby communicate inlet 64 through an annular recess 65 of the plunger 62 with an outlet 66 to allow fluid to be delivered into reservoir 2. The discharging flow from the steering device returns directly to the reservoir through the assembly 60.

In case of further increase in pressure in the line 6 to a preset value, the other plunger 67 is so shifted to the right against spring 70 as to allow communication between another inlet 68 with outlet 69 to which connects the return line 14 leading to the reservoir 2. The communication between the inlet 68 and outlet 69 provides means to prevent the other relief valve 16 from opening to thereby leave the steering device 8 actuatable although increase in pressure attains to the high limit in line 6.

Figure 4:
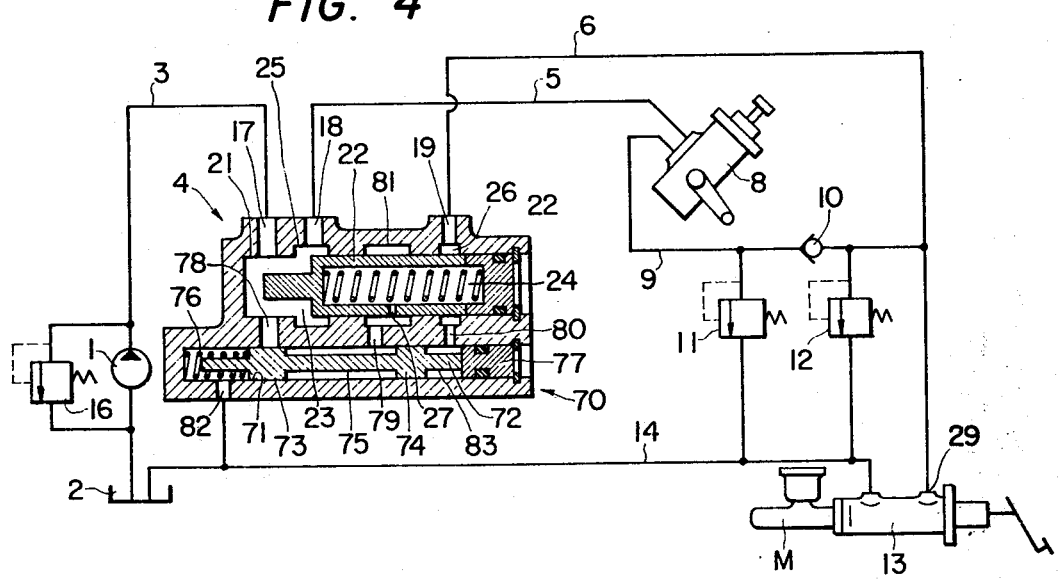

In the embodiment in FIG. 4, no flow of fluid passes through the outlet 19 of the flow divider 4 when the booster 13 is in its rest position whereas a small portion of the pump flow enters into the port 29 of the booster 13 from the steering device 8 and passes therethrough. A difference between the embodiment in FIG. 1 and that in FIG. 4 is based upon the above mentioned operation. However, both embodiments operates in the same manner such that when the booster 13 is operated for actuating the brakes of the vehicle, whole of the pump flow passes through the booster at the early stage of the braking operation and at the subsequent stage a portion of the pump flow passes through the booster in order to avail from the pump a higher level pressure for actuating the booster and accordingly shifting hydraulic fluid of higher level pressure into wheel cylinders of hydraulically operated brake.

In the embodiment in FIG. 4, a valve 70 is provided to associate with the flow divider 4. A valve spool 72 is contained in a valve bore 71 in close fitting slidable relationship. The valve spool 72 has two spaced lands areas 73 and 74 to form a large annular groove 75 therebetween. A compressed spring 76 bears against the end of the bore 71 at one end and at the other end against the land 73 to normally urge the spool 72 to the plug 77. The large bore 71 is connected through three spaced passages 78 to 80 with the bore 21. The passage 80 is connected to the annular recess 26 and the passage 79 is connected to an annular recess 81 in the internal face of the bore 21 of the flow divider 4. The large bore 71 further connects with the return line 14 for exposing the left hand side of the spool 72 against the atmospheric pressure in the reservoir 2 through the line 14. At the right hand end of the bore 71 is defined a chamber 84 by the spool and the plug 77, which chamber connects through the passage 80 with the chamber 24 in the flow divider 4.

In the rest position of the booster 13, the spool 71 occupies the position shown with left hand land 73 closing passage 78. It will be understood that no flow of fluid passes through the outlet port 19 into the line 6 in the condition shown. The whole of the pump flow therefore passes through the other outlet 18, line 5, steering device 8, line 9, check valve 10, line 6, booster 13, and line 14 to the reservoir 2.

Figure 4A:
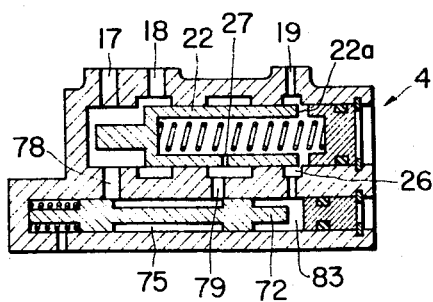

When the booster is operated for actuating the brakes of the vehicle, the flow of fluid through the booster is restricted and pressure builds up in the booster and the line 6. Discharging of hydraulic fluid under pressure is therefore effected into the wheel cylinders of hydraulically operated brakes. At an early stage of the increase in pressure, the above mentioned fluid circuit continues until the increase attains to a predetermined level of pressure and in case of further increase in pressure beyond the level, the check valve 10 is closed and the discharging flow from the steering device thereafter passes through the relief valve 11 into the return line 14 and in turn into the reservoir. It is obvious that the installed load of the spring (not shown) urging the relief valve 11 to its closed position should be properly selected in order to obtain the desired result as above. Upon the increase in pressure in the line 6, the chamber 83 obtains that increased pressure through port 19 and annular recess 26. The spool 72 is accordingly urged to the left by the pressure in chamber 83 to thereby communicate the passage 79 through annular groove 75 and passage 78 with the chamber 23. A limited flow of fluid passes through the orifice 27 into spring containing cavity 24 and builds up a fluid pressure within the chamber 24 to urge the plunger 22 to the left and performs control action by cooperation of the annular recess 26 and the right extremity of the plunger 22 as shown in FIG. 4a, and regulated flow is obtained from the port 19.

The booster 13 is thereafter supplied input fluid pressure directly from the outlet port 19 of flow divider 4. Higher level pressure is available than is available at the first stage of the braking operation at which the input fluid flow is received from the steering device in the same manner as the first embodiment in FIG. 1. Further description therefore is considered to be unnecessary.

Figure 5:
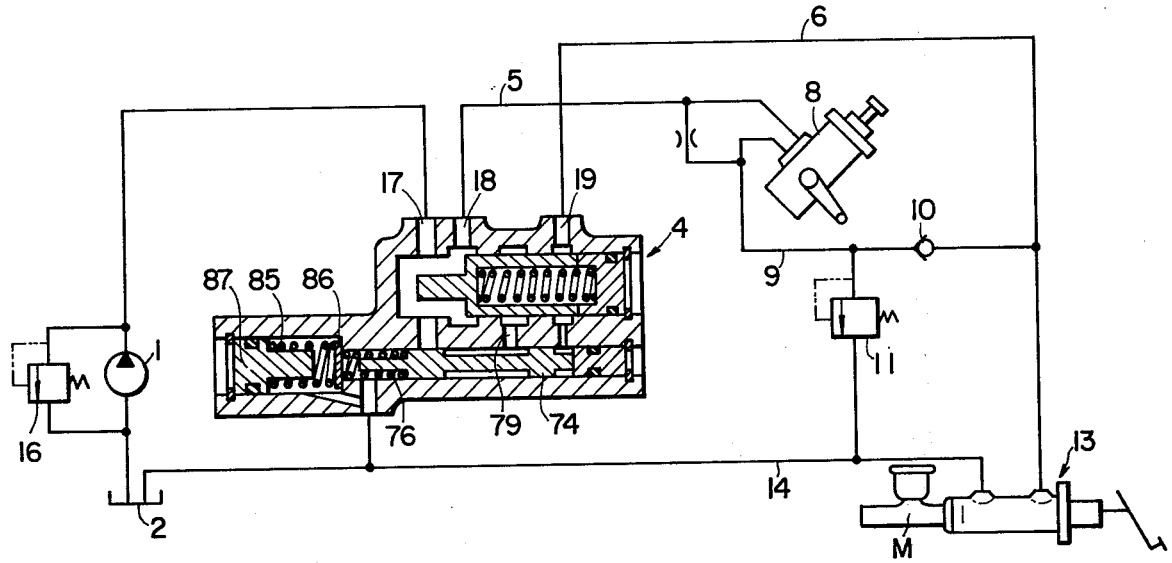

In FIG. 5 is shown a modification of the embodiment in FIG. 4 in which control means is provided for keeping a high limit level of pressure in line 6 below that which is predetermined by the other relief valve 16 in the same manner as the relief valve 12 of the embodiment in FIG. 4.

In FIG. 5, the same parts as those in FIG. 4 are designated by the same numerals and duplicated description is abbreviated.

The flow divider 4 is provided with duplicated second control spring 85 which bears at one end against a retainer 86 to which seats the other first control spring 76. The other end of the spring 85 is seated to a plug 87. An installed load of the second spring 85 suitably exceeds that of the spring 76.

Figure 5A:
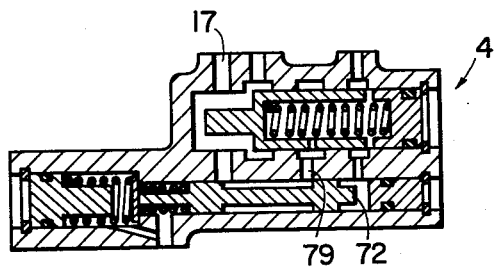
Figure 5B:
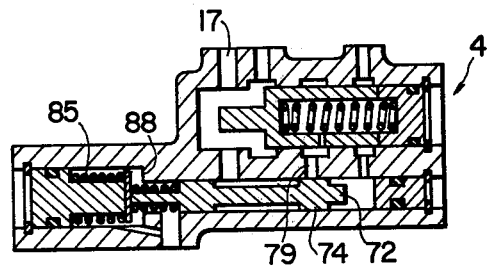

In operation, the spool 72 functions in the same manner as that of the embodiment in FIG. 4. In case of unusually higher increase in pressure within the line 6, the spool 72 further moves to the left as shown in FIG. 5b, causing the second spring to be compressed with the retainer 86 apart from shoulder 88, so that the land 74 of the spool 72 blocks the passage 79 as seen in FIG. 5b from receiving any fluid from the pump port 17 of the divider 4. This obviously results in stop in fluid flow into the booster 13 so that further increase in pressure will cease and thence results in a drop in booster pressure so that the spool 72 returns to its original position shown in FIG. 5a.

From the foregoing it will be apparent that the provision of the second control spring 85 provides means to predetermine a high level limit of pressure in booster below that predetermined by the other relief valve 16 as is performed by the relief valve 12 in FIG. 4.

Figure 6:
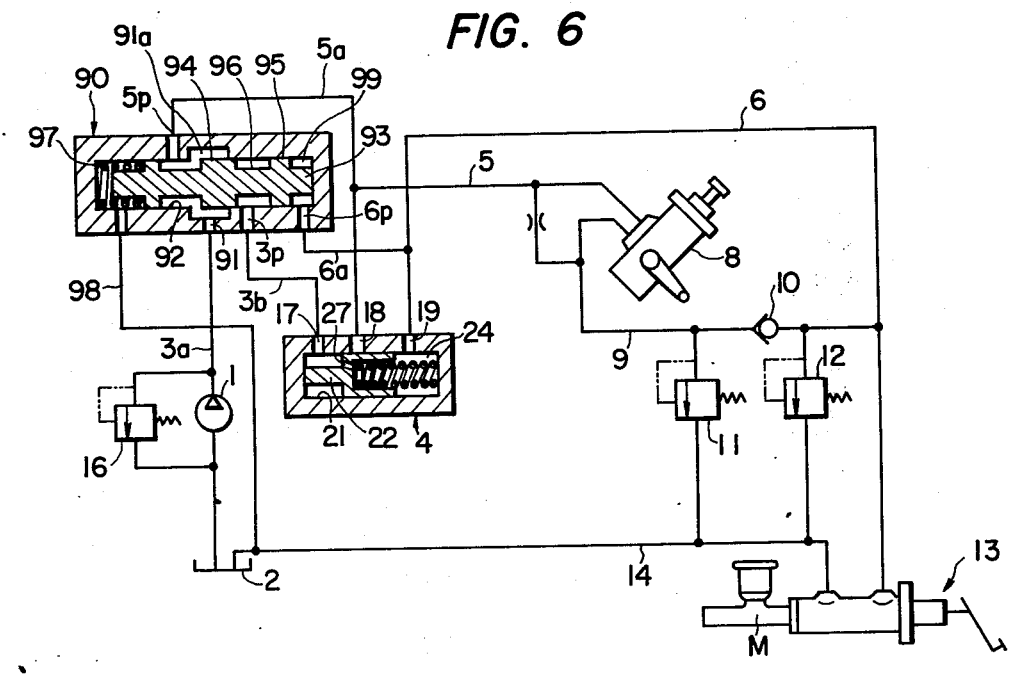

In FIG. 6 is shown still another modification of the embodiment shown in FIG. 4. In this modification, all the principal parts are in the same relationship as that of the embodiment in FIG. 1 except that a switching valve 90 is interposed between the pump 1 and the flow divider 4 in order to change the relationship when the booster 13 is actuated.

The switching valve 90 is made up generally of a body casting. The pump port 91 is shown as forming the mouth of a valve bore 92 which contains, in close fitting slidable relationship, a valve spool 93 having two spaced lands 94 and 95 to form therebetween an annular groove 96. In the internal face of the bore 92 is formed an annular groove 91a to which is connected the port 91. The port 91 is connected to the discharge port of the pump 2 by the conduit 3a. The bore 92 has port 5p connected to the conduit 5 by the branch conduit 5a, port 6p connected to the line 6 by a conduit 6a and port 3p connected to the conduit 3. A control spring 97 bears against the left face of the spool 93 and at the other end against the left end of the bore 92, to normally urge the spool against the right end of the bore 92. A spring containing cavity formed at the left side of the spool 93 is connected through a conduit 98 to the reservoir 2 in order to keep the cavity at atmospheric pressure.

When the booster 13 is not actuated the spool 93 is kept in the position shown by the spring 97. The pump flow is therefore passes through the line 3a, port 91, port 5p, branch conduit 5a, to the steering device 8. As the port 3p is disconnected from the conduit port 91 as shown by the land 94, the flow divider 4 is blocked from receiving any fluid from the pump port 17, so that the plunger 22 is spring biased to the left end of the bore 21 as shown with the outlet port 18 closed. Although the chamber 24 is fluidically conductive with the booster 13 in this condition, the chamber also is blocked from receiving any fluid from the pump inlet port 17 through the orifice 27. Thereafter the booster pressure is kept at atmospheric pressure in the rest position of the booster 13.

When the booster is operated for actuating the brakes of the vehicle, the flow of hydraulic fluid through the booster mechanism is restricted and pressure builds up in the booster is immediately transmitted through the conduit 6, branch 6a and port 6p into the power chamber 99 of the switching valve 90, causing accordingly the spool 93 to move to the left. The land 94 of the spool accordingly blocks communication between the ports 91 and 5p while allows the port 91 to be connected to the port 3p. The flow divider is therefore allowed to receive pump flow from the pump port 17 through line 3b and therefore the same operation is performed as that previously described in the foregoing.

In case where the fluid pressure in the booster 13 attains to the value at which the relief valve 11 opens and valve 10 is closed, operation of the system is performed in the same manner as that described in the foregoing in respect of the embodiment shown in FIG. 1.

What is claimed is:

1. A hydraulic fluid power system for operating vehicle brakes comprising:

a source of hydraulic fluid flow;

a flow divider having an inlet port in fluid communication with said fluid source for receiving fluid flow from said fluid source and having a first outlet to deliver a regulated fluid flow and a second outlet to deliver a surplus fluid flow;

said flow divider including a spring-biased reciprocating sleeve having an orifice therein for restricting flow between said inlet port and said first outlet, wherein a pressure differnce across said orifice urges said sleeve to a position permitting fluid communication between said inlet port and said second outlet;

a hydraulic fluid vehicle brake system including:

a master cylinder;

a hydraulic fluid booster operatively connected to the master cylinder for assisting pressurization of fluid in the master cylinder by utilizing fluid pressure built up by restricting fluid flow through said booster, said booster including open center type valve mechanisms having an inlet port in fluid communication with the first outlet of said flow divider to deliver the regulated fluid flow of said flow divider and having an outlet in fluid communication with a reservoir for exhausting fluid;

hydraulic fluidically operating power steering means including open center type valve mechanisms for operation by utilizing fluid pressure built up by restricting fluid flow therethrough for steering a vehicle, an inlet port connected to the second outlet of said flow divider through which the surplus fluid flow is delivered to the power steering means and a first conduit communicating an outlet port of said power steering means with the inlet port of said booster, said conduit having disposed therein a check valve to permit fluid flow only in the direction from the power steering means to the booster; and, a second conduit directly interconnecting the outlet port of the steering means and said reservoir and having disposed therein a first relief valve to permit fluid flow only in the direction from said power steering means to said resevoir depending upon a predetermined value of pressure which is lower than a valve of pressure at the inlet port of said booster;

wherein said booster is bypassed by a third conduit interconnecting directly the inlet port of said booster and said resevoir, said third conduit having a second relief valve therein permitting fluid flow only in the direction from the inlet port of the booster to the reservoir depending upon a predetermined value of pressure at the inlet port of the booster and the fluid source being provided with a bypassing line to directly connect an outlet port of said fluid source to said resevoir, said bypassing line having disposed therein a third relief valve permitting fluid flow only in the direction from the outlet port of said fluid source to said reservoir depending upon a predetermined value of pressure, said predetermined value of pressure upon which said third relief valve depends being higher than the pressure upon which said second relief valve depends.

* * * * *